(12) United States Patent
Schleicher (10) Patent No.: US 9,565,802 B2
(45) Date of Patent: Feb. 14, 2017

(54) CROP SENSING SYSTEM AND METHOD WITH IMMEDIATE GAP DETECTION

(71) Applicant: Deere & Company, Moline, IL (US)

(72) Inventor: Tyler D. Schleicher, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 347 days.

(21) Appl. No.: 14/282,568

(22) Filed: May 20, 2014

(65) Prior Publication Data
US 2015/0334919 A1    Nov. 26, 2015

(51) Int. Cl.
| | |
|---|---|
| A01D 41/14 | (2006.01) |
| A01D 75/00 | (2006.01) |
| G07C 5/08 | (2006.01) |
| G01D 5/14 | (2006.01) |
| A01B 69/04 | (2006.01) |
| A01D 41/127 | (2006.01) |
| A01B 15/10 | (2006.01) |

(52) U.S. Cl.
CPC ............. *A01D 75/00* (2013.01); *A01B 69/008* (2013.01); *A01D 41/1278* (2013.01); *G01D 5/142* (2013.01); *G07C 5/085* (2013.01); *A01B 15/10* (2013.01)

(58) Field of Classification Search
CPC ..... A01B 69/00; A01B 69/008; A01B 79/005; A01B 15/10; A01D 41/1278; A01D 46/16; A01D 46/08; A01D 45/05; A01D 75/00; G01S 13/931; G01S 2013/9342; G01S 2013/9389; G05D 1/0227; G05D 1/0259; G05D 2201/0201; G07C 5/085; G01D 5/142; Y10S 56/11; Y10S 56/15

USPC ....... 33/382, 521; 56/10.2 E, 10.2 F, 10.2 R; 172/2–11; 701/50
See application file for complete search history.

(56) References Cited

U.S. PATENT DOCUMENTS

| | | | | |
|---|---|---|---|---|
| 4,726,175 A | * | 2/1988 | Day ........................ | A01B 69/00 172/5 |
| 5,170,359 A | * | 12/1992 | Sax .......................... | G10L 25/48 324/102 |

(Continued)

FOREIGN PATENT DOCUMENTS

| | | |
|---|---|---|
| EP | 0381073 A2 | 8/1990 |
| WO | 2009042238 A1 | 4/2009 |

OTHER PUBLICATIONS

Wikipedia, "Circular buffer" [online article], [retrieved on Jun. 23, 2013], Retrieved from http://en.wikipedia.org/wiki/Circular_buffer (4 pages).

(Continued)

*Primary Examiner* — Robert Pezzuto (57) ABSTRACT

An agricultural machine includes a crop row sensor which has a movable paddle which interacts with plants in the crop row, and which periodically generates a sensor signal representing a position of the paddle. A signal processing system includes a memory which stores a plurality of sensor signals. The system determines a minimum magnitude of the stored sensor signals, and generates a drop rate signal representing a change in the sensor signal in a period of time. A gap detection unit generates the gap signal if the minimum signal is less than a threshold and if the drop rate is greater than a drop rate threshold. Thus, the system generates a gap signal when the paddle encounters a gap in the crop row.

16 Claims, 10 Drawing Sheets

(56) References Cited

U.S. PATENT DOCUMENTS

| | | | |
|---|---|---|---|
| 5,181,572 A | 1/1993 | Andersen et al. | |
| 5,185,990 A * | 2/1993 | Barnes | A01D 46/08 |
| | | | 56/10.2 F |
| 6,079,192 A | 6/2000 | Rasmussen | |
| 6,945,019 B1 * | 9/2005 | Sonnek | A01D 46/16 |
| | | | 172/2 |
| 7,716,905 B2 | 5/2010 | Wilcox et al. | |
| 2007/0294906 A1 * | 12/2007 | Reichhardt | G01B 7/14 |
| | | | 33/832 |
| 2011/0118926 A1 | 5/2011 | Peake et al. | |

OTHER PUBLICATIONS

European Search Report issued in counterpart application No. 15163795.6, dated Oct. 7, 2015 (9 pages).

* cited by examiner

CROP SENSING SYSTEM AND METHOD WITH IMMEDIATE GAP DETECTION

FIELD OF THE INVENTION

The present disclosure relates to a system and method for processing signals from crop row sensors.

BACKGROUND OF THE INVENTION

Automatic steering systems have been designed for agricultural vehicles. Such systems utilize crop row sensors that feel the crop stalks and determine appropriate steering actions for the vehicle based on the feedback from these row sensors. For example, U.S. Pat. No. 7,716,905, issued to Wilcox et al. in 2010, and assigned to the assignee of the present application, describes a sensing assembly for detecting plants or plant stalks in a crop row. This assembly includes a movable arm which interacts with plants standing in a field and a sensor which generates a signal depending on the position of the movable arm.

Another known crop row sensor includes a long rubber bar or paddle. A magnet is attached to the paddle. When the paddle touches a crop stalk, it bends as the stalk pushes the tip of the paddle backwards. The amount that the paddle bends backwards is measured with a Hall-Effect sensor which senses a magnetic field produced by the magnet. The sensor voltage increases as the paddle is bent further back, so that the sensor voltage represents the position of the crop row relative to the vehicle. When the paddle is straight (not bent back), the sensor voltage is very low and this is interpreted as missing or absent crop.

Occasionally, there are gaps or absences of stalks in a crop row. In some cases these gaps can be fairly long (10-20 ft). During these gaps, the steering system must determine what action is appropriate as soon as possible in order to keep the vehicle properly aligned with the crop row.

When the paddle has been pushed back and then reaches a space where there is a gap in the row (no plants), the rubber paddle will "bounce" forward and oscillate for a few seconds until it settles completely in the relaxed straight position. This bouncing of the rubber paddle produces an oscillating sensor voltage. This oscillating voltage is interpreted as indicating that there is a gap in the crop row. Previously, it could be determined that a crop gap existed only ½ to 3 seconds after the start of a bouncing event. During this time, the machine does not steer effectively to remain on the row. This is because at typical corn harvesting speeds of 4 to 6 miles per hour, 5 to 9 feet of distance is covered per second. It is desired to detect a bouncing event more quickly so that the vehicle can be steered more accurately while it is motion.

SUMMARY

According to an aspect of the present disclosure, a system and method is provided for processing signals from a crop sensor. The crop sensor includes a rubber paddle which engages plants in the crop row. When there is a gap in the crop row, the paddle moves into the gap and bounces until it comes to rest in an extended position. The sensor periodically generates a sensor signal with a parameter, such as voltage, representing a position of the paddle. The signal processing system includes a memory or ring buffer which stores a plurality of the sensor signals. A minimum signal measuring unit determines a minimum magnitude of the sensor signals stored in the memory. A comparison unit compares the minimum magnitude to a threshold. The comparison unit generating a gap signal representing an absence of plants in the crop row if the minimum signal is less than the threshold. The capacity of the ring buffer is related to a time required for motion of the paddle to cease when a gap in the crop row is encountered.

The signal processing system also includes a drop rate unit which generates a drop rate signal representing a change in the sensor signal in a period of time, and a gap detection unit which generates the gap signal as a function of the minimum magnitude and the drop rate signal. The gap detection unit compares the minimum magnitude to a first threshold and generates a no gap flag if the minimum magnitude is not below the first threshold. If the minimum magnitude is below the first threshold, the gap detection unit compares the drop rate to a second threshold, generates the no gap flag if the drop rate is not greater than the second threshold, and generates a gap detected flag if the drop rate is greater than the second threshold.

Thus, the signal processing system and method includes recording and constantly updating a small history of voltage data from the crop sensor in a ring buffer. The capacity of the ring buffer is sufficient to include a recording history that is long enough to capture an entire period of a bounce cycle of the rubber paddle. If the minimum voltage in the ring buffer is below a threshold, it means that the paddle encountered a gap in the crop row, and the system generates a gap signal.

BRIEF DESCRIPTION OF THE DRAWINGS

FIG. 3 is a diagram showing the relationship between FIGS. 3A and 3B;

DETAILED DESCRIPTION OF THE DRAWINGS

Figure 1:
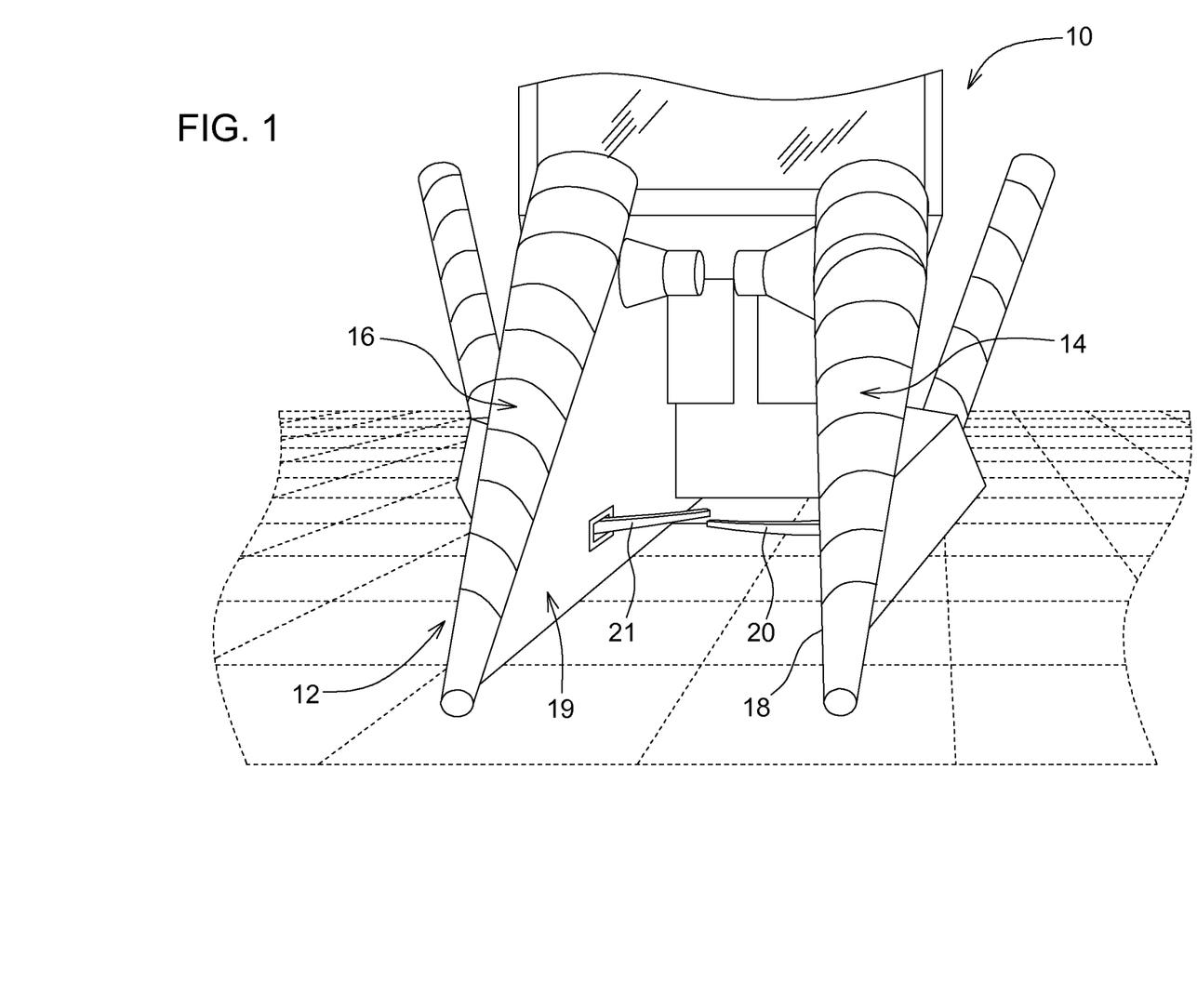
FIG. 1 is a front perspective view of a header of a crop harvesting machine for which the present invention can be used.

Referring to FIG. 1, a crop harvester 10 includes a header 12 which gathers crop and directs the crop into the harvester 10. The header 12 includes a pair of stalk rolls 14 and 16. Left and right crop sensing units 18, 19 are mounted on each stalk roll 14, 16. Each crop sensing unit 18, 19 includes a rubber bar or paddle or feeler 20, 21 which projects laterally away from the stalk roll on whit is mounted and towards the other stalk roll.

Figure 2:
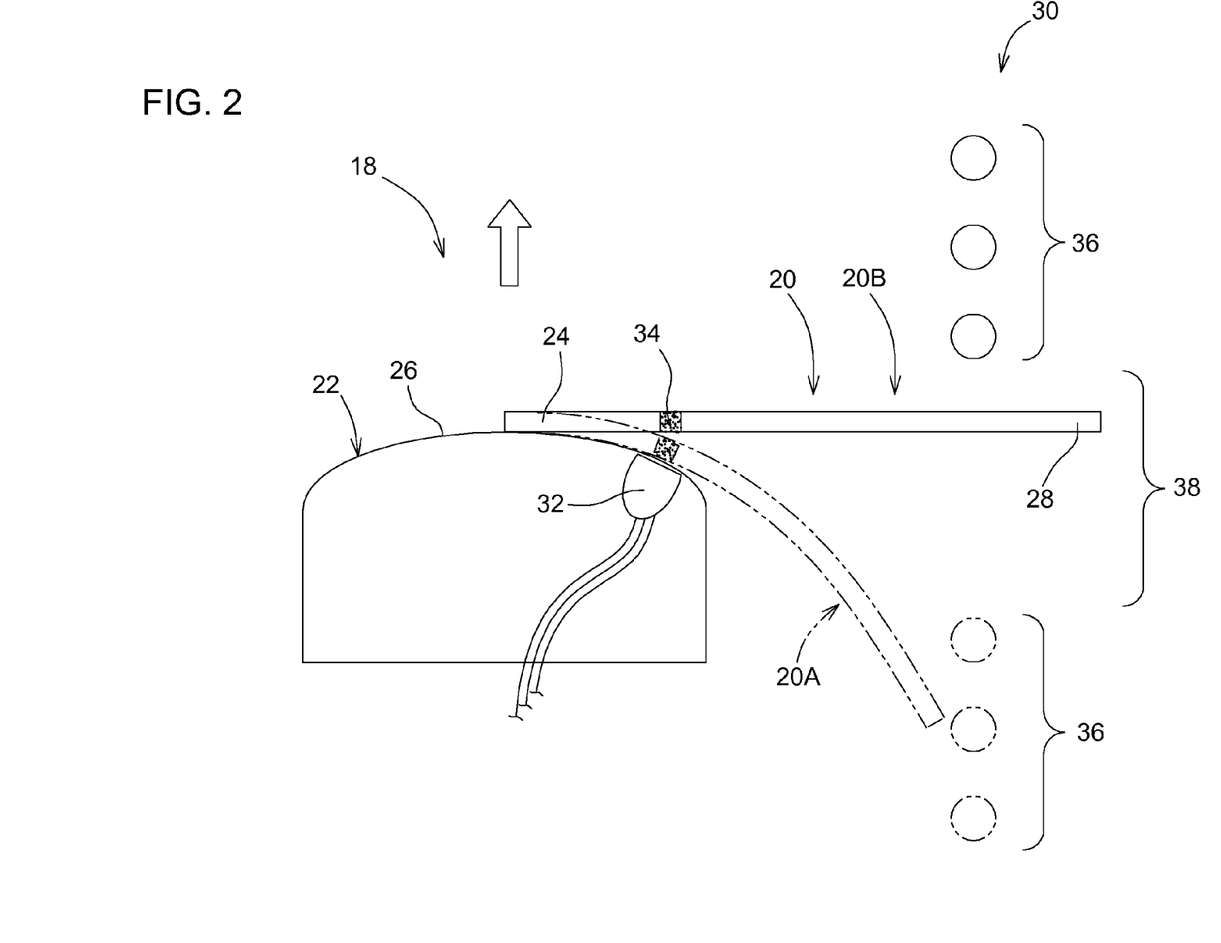
FIG. 2 is a schematic diagram the crop sensing assembly which is mounted to the header of FIG. 1.

As best seen in FIG. 2, the left crop sensing unit 18 is conventional and is exemplary of both the left and right units 18 and 18. Left crop sensing unit 18 includes sensor housing 22. The paddle 20 has a first end 24 fixed to a forward outer surface 26 of the housing 22 and a second end 28 which projects into a crop row 30. A Hall Effect sensor 32 is mounted in the housing 22 so that it can interact with a magnet 34 which is attached to the paddle 20. The crop row consists of a plurality of plants or crop stalks 36. When the paddle 20 engages the crop stalks 36, it is bent in a rearward direction into a position such as 20A. When there is a gap 38 in the crop row, the paddle 20 will spring forward and bounce or oscillate until it occupies a relaxed position such as 20B. As the paddle 20 moves, the magnet 34 moves relative to the Hall Effect sensor 32, and the Hall Effect sensor generates a signal which has a voltage which is a function of the distance between the magnet 34 and the Hall Effect sensor 32.

Figure 3A:
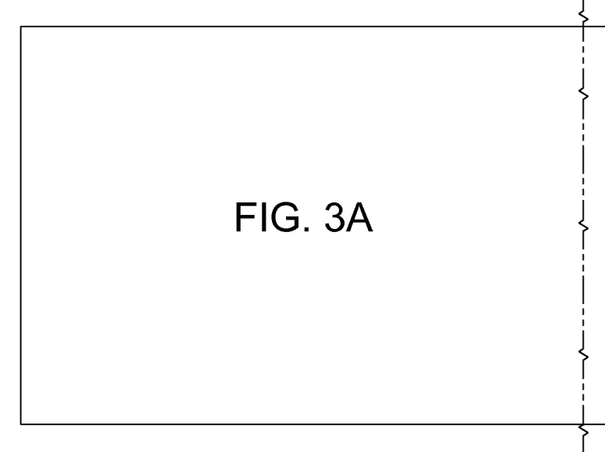
FIGS. 3A and 3B form a schematic block diagram of a signal processing system which processes the sensor signals from a pair of the crop sensing assemblies of FIG. 2.
Figure 3B:
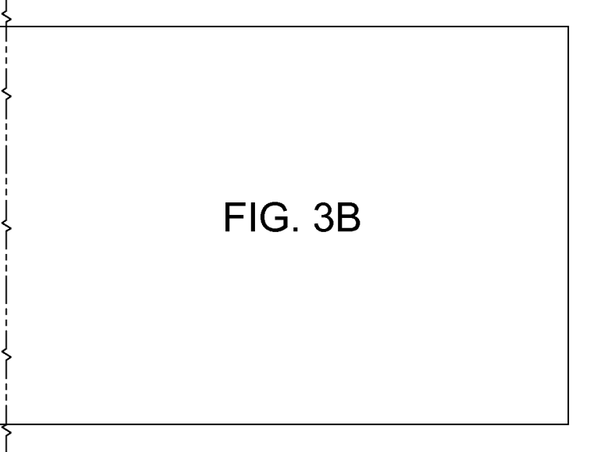

Referring now to FIGS. 3A and 3B, the signals from the left and right sensors 32 are received by a signal processing system 40. The signal processing system 40 includes algorithms which were developed or implemented using commercially available MATLAB language. The conversion of the following diagrams and flow charts into a standard language for implementing the system in a digital computer or microprocessor, will be evident to one with ordinary skill in the art.

Signal processing system 40 includes left and right A/D converters 42, 44 which receive the corresponding sensor signals from the left and right Hall Effect sensors 32. Preferably, the sensor signals range from 0-5 v analog and are sampled at 50 Hz and converted to 16-bit digital signals or values. Left and right paddle row error estimators 46, 48 and left and right ring buffers 50, 52 all receive the corresponding digital left and right sensor voltages. Left and right minimum voltage measuring units 54 and 56 determine the minimum voltage stored in the corresponding ring buffer 50, 52 and provide a drop rate value and a minimum voltage value to corresponding left and right gap detection units 58, 60. The left and right paddle row error estimators 46, 48 provide left and right row error values to a fusion/arbitration unit 62. The left and right gap detection units 58, 60 provide corresponding left and right gap values to the fusion/arbitration unit 62. The fusion/arbitration unit 62 provides a steering error signal to a steering/guidance system (not shown) of the harvester 10 (FIG. 1).

Figure 4:
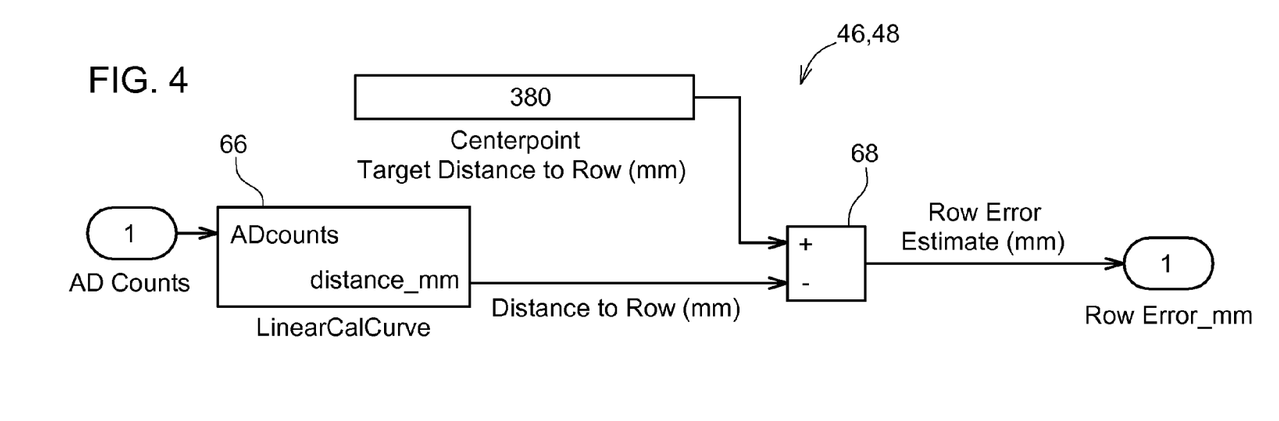
FIG. 4 is a schematic diagram of the paddle row error estimator unit of FIG. 3A.

Referring now to FIG. 4, each left and right paddle row error estimator 46, 48 applies the digital sensor voltage to a stored order calibration curve 66 to obtain a corresponding left and right row position estimate value. The row position estimate values are subtracted by a subtractor 68 from a target distance to row values to generate left and right row error values.

Referring again to FIG. 3A, each left and right ring buffer 50, 52 continuously stores the most recent corresponding digital left and right sensor voltage value. In each ring buffer 50, 52, the oldest sored sensor value is deleted when the newest value is received. Preferably, each ring buffer is large enough (or holds a sufficient number of values, such as 25) so that it can capture the number of sensor values which would be produced during a bouncing or oscillation cycle of the paddle 20.

Figure 5:
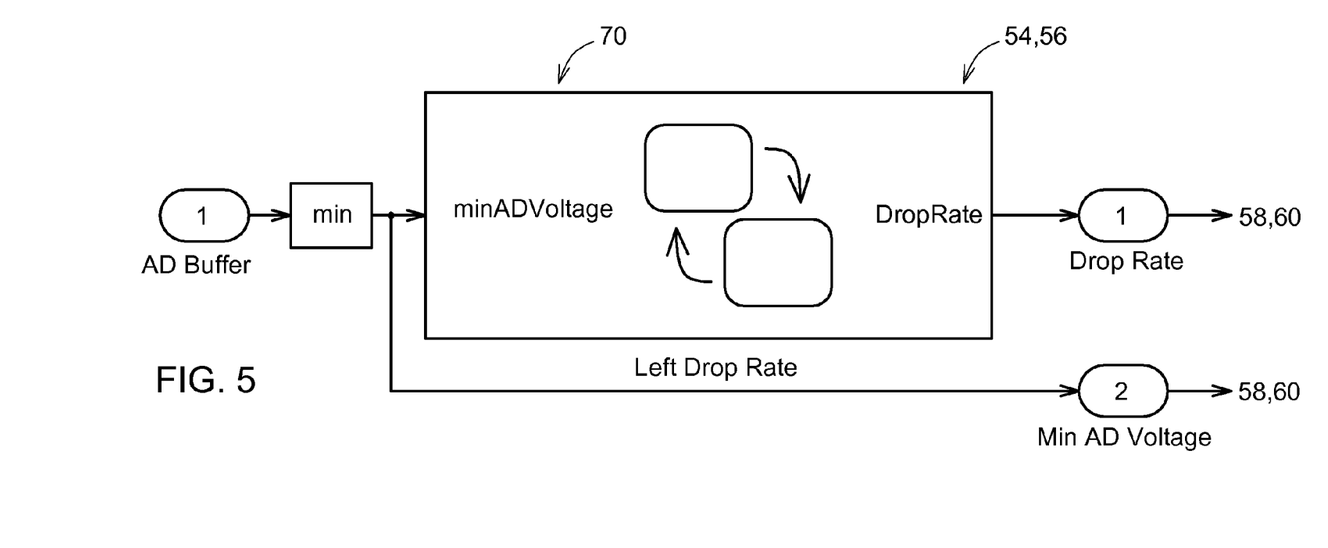
FIG. 5 is a schematic diagram of minimum voltage measuring unit of FIG. 3A.

Referring now to FIG. 5, each left and right minimum voltage measuring unit 54 and 56 periodically extracts the corresponding minimum sensor voltage from the corresponding ring buffer 50, 52 and transmits this minimum value to the corresponding gap detection unit 58, 60. Each left and right minimum voltage measuring unit 54 and 56 also includes a ring buffer 70. The minimum values are also periodically stored in this ring buffer 70. The values stored in ring buffer 70 are used to determine a rate of change (or drop rate) of the minimum voltage value. This is done by taking a difference between the oldest and most recent stored values and dividing this difference by the elapsed time. This drop rate value is also transmitted to an input of the corresponding gap detection unit 58, 60.

Figure 6:
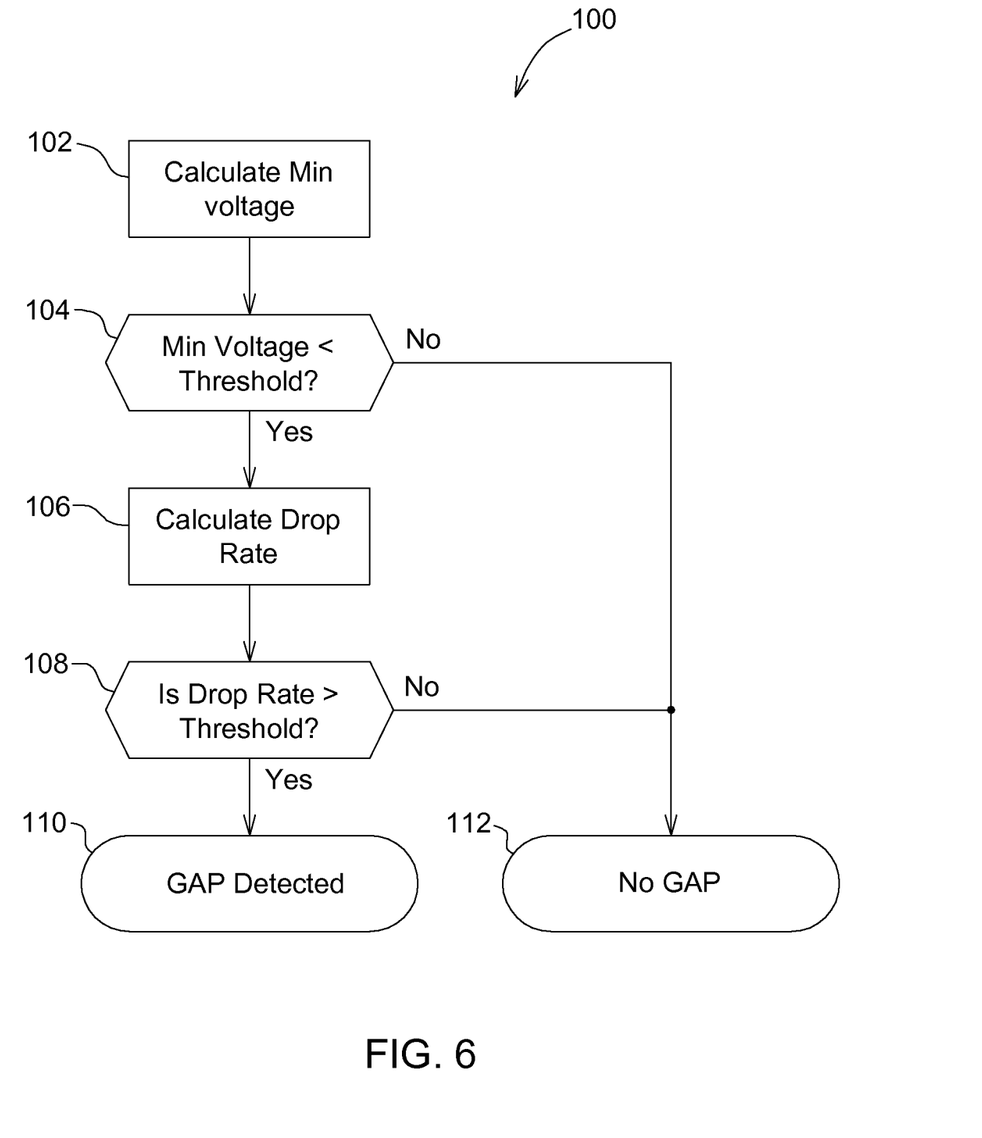
FIG. 6 is a logic flow diagram of the algorithm executed by the gap detection units of FIG. 3A.

Referring now to FIG. 6, each left and right gap detection unit 58, 60 executes an algorithm 100. The algorithm begins at step 102 which determines the minimum voltage stored in the ring buffer 50, 52. If the minimum voltage is less than a threshold, such as 1 volt for example, then it is possible that a gap has been detected in the crop row 30, then step 104 directs the algorithm to step 106, else to step 112 which generates a no gap flag.

Step 106 determines the voltage drop rate by calculating the voltage change from the oldest to newest voltages in the ring buffer 50, 52 and dividing this change by the time elapsed between the oldest and newest voltage values.

Then, if the drop rate is greater than a threshold, such as 0.1 volt/second for example, then a gap has been detected in the crop row 30, and step 108 directs the algorithm to step 110 which generates a gap flag, or else to step 112 which generates a no gap flag.

Thus, each gap detection unit 58, 60 operates to monitor the corresponding paddle to determine if the paddle is in free motion because it encountered a gap in the crop row 30. The gap detection unit 58, 60 determines that the paddle has entered a gap if the minimum voltage in the ring buffer 50, 52 is below a voltage threshold, such as 1 volt, AND the minimum voltage drop rate (from units 54, 56 is greater than a drop rate threshold, such as 0.1 v/sec. The gap detection unit 58, 60 determines that the paddle has not entered a gap if the minimum voltage of the ring buffer 50, 52 is greater than the voltage threshold (1 volt)

Figure 7:
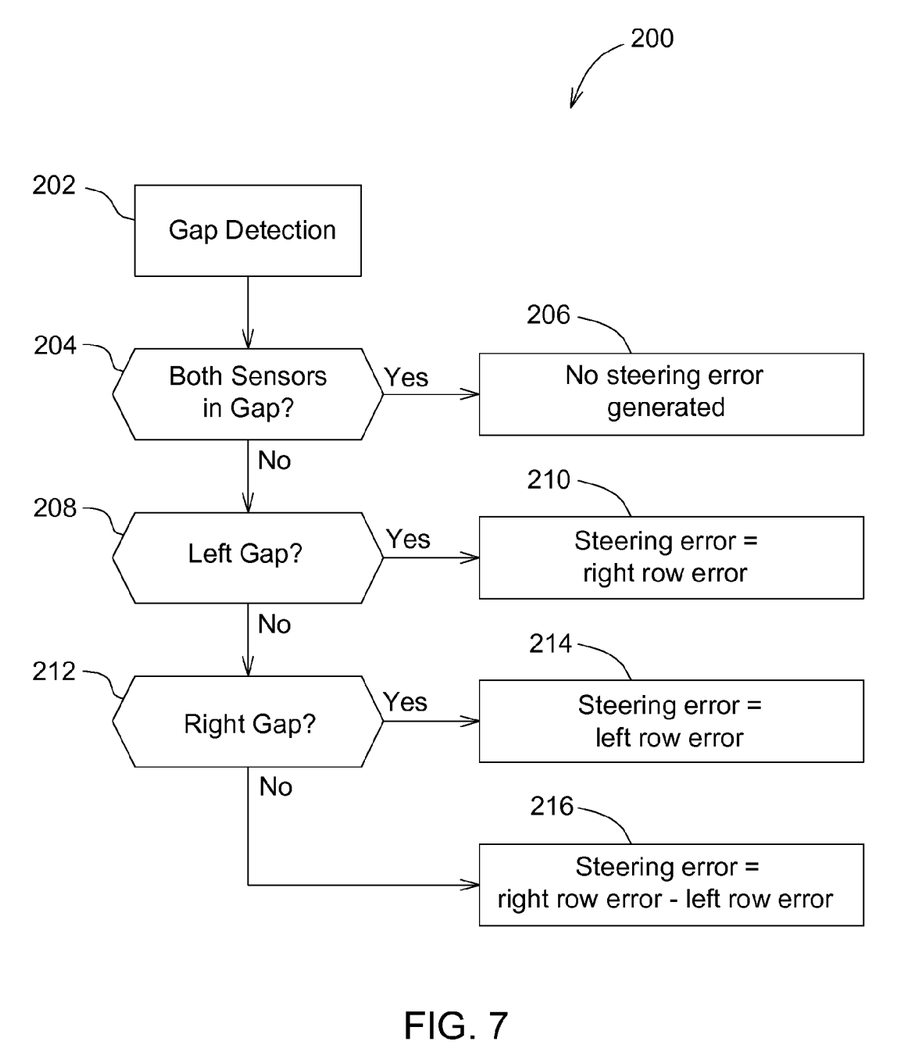
FIG. 7 is a logic flow diagram of the algorithm executed by the fusion/arbitration unit of FIG. 3B.

Referring now to FIG. 7, the fusion/arbitration unit 62 executes an algorithm 200. The algorithm begins at step 202 which obtains the left and right row error values from units 46, and 48, respectively. Step 202 also obtains the left and right gap or no gap flags from the left and right gap detection unit 58, 60.

If both the left and right gap detection unit 58, 60 are generating gap flags, then step 204 directs the algorithm to step 206 and no steering error signal is generated, else step 204 directs the algorithm to step 208.

If the left gap detection unit 58 is generating a gap flag, then step 208 directs the algorithm to step 210 which sets the steering error signal equal to the right row error, so that the steering system (not shown) will steer the machine solely on the basis of the right row error signal generated by the right crop sensor, else step 208 directs the algorithm to step 212.

If the right gap detection unit 60 is generating a gap flag, then step 212 directs the algorithm to step 214 which sets the steering error signal equal to the left row error, so that the steering system (not shown) will steer the machine solely on the basis of the left row error signal generated by the left crop sensor, else step 212 directs the algorithm to step 216.

Step 216 is executed if both left and right sensor 20 and 21 are deflected, in which case step 216 sets the steering error equal to a difference between the right row error and the left row error.

The result is a system which detects a gap condition within 100 milliseconds of the gap event occurring, so that various actions can be taken to keep the machine on the row. If there is a gap in only one row, the steering system can steer based on the other crop row sensor which is not sensing a gap. If gaps are sensed in both crop rows, then the machine can be steered in a coasting mode. Because new data is added to the ring-buffer immediately when it is recorded, detection of a gap condition can happen immediately instead of waiting for an entire period of a paddle bounce to occur.

Figure 8:
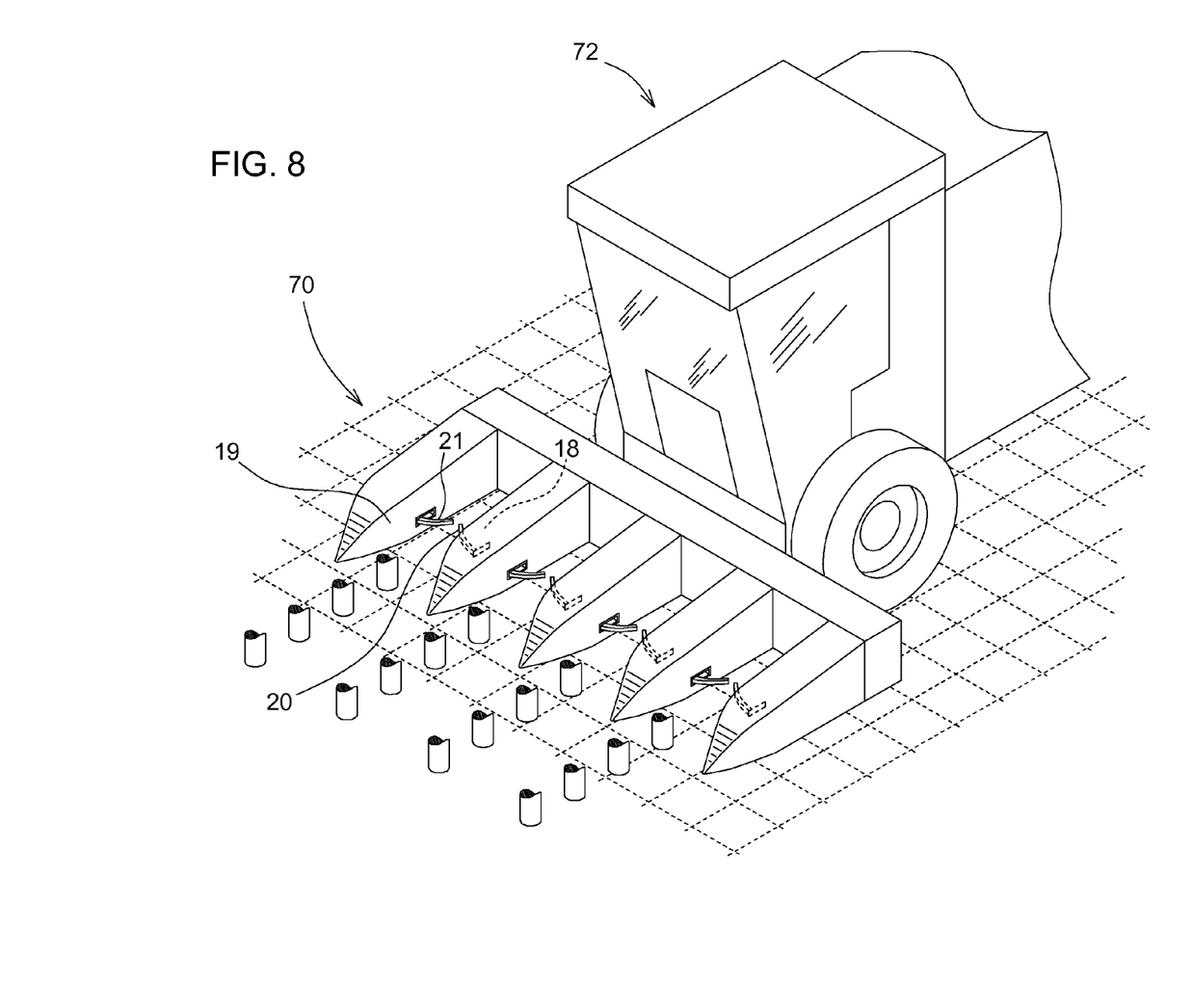
FIG. 8 is a front perspective view of a corn header for which the present invention can be used.
Figure 9:
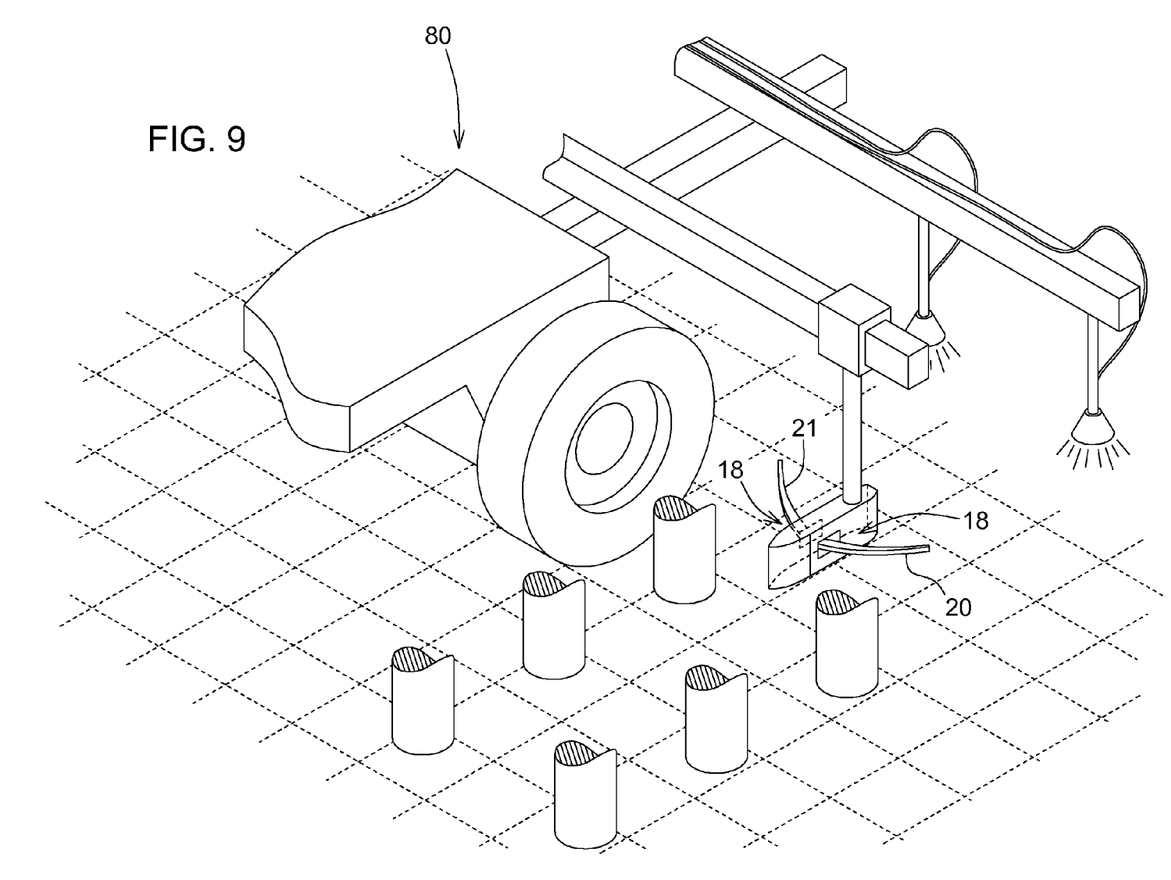
FIG. 9 is a front perspective view of a sprayer machine for which the present invention can be used.

Referring now to FIGS. 8 and 9, the crop sensing units 18, 19 and the paddles 20, 21 may be used for the other crop sensor applications. For example, they may be used on a harvester such as on the corn head 70 of a corn harvester 72 (FIG. 8), and on a sprayers 80 (FIG. 9).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. In an agricultural machine having a crop row sensor, the crop row sensor having a movable paddle which interacts with plants in the crop row, the sensor periodically generating a sensor signal with a parameter representing a position of the paddle, a signal processing system comprising:
    a memory which stores a plurality of sensor signals;
    a minimum signal measuring unit which determines a minimum magnitude of the sensor signals stored in the memory; and
    a comparison unit which compares the minimum magnitude to a threshold, the comparison unit generating a gap signal representing an absence of plants in the crop row if the minimum signal is less than the threshold.

2. The signal processing system of claim 1, wherein: the memory comprises a ring buffer.

3. The signal processing system of claim 2, wherein: a capacity of the ring buffer is related to a time required for motion of the paddle to cease when a gap in the crop row is encountered.

4. The signal processing system of claim 1, further comprising:
    a drop rate unit which generates a drop rate signal representing a change in the sensor signal in a period of time; and
    a gap detection unit, for detection of a gap in the crop row, which generates the gap signal as a function of the minimum magnitude and the drop rate signal.

5. The signal processing system of claim 4, wherein: the gap detection unit compares the minimum magnitude to a first threshold
    and generates a no gap flag if the minimum magnitude is not below the first threshold; and
    if the minimum magnitude is below the first threshold, the gap detection unit compares the drop rate to a second threshold, generates the no gap flag if the drop rate is not greater than the second threshold, and generates a gap detected flag if the drop rate is greater than the second threshold.

6. The signal processing system of claim 1, wherein:
    a capacity of the memory is related to a time required for motion of the paddle to cease when a gap in the crop row is encountered.

7. In an agricultural machine having left and right crop row sensors, each crop row sensor having a corresponding left and right movable paddle which interacts with plants in the crop row, each sensor periodically generating a corresponding left and right sensor signal with a parameter representing a position of the corresponding paddle, a signal processing system comprising:
    a left memory which stores a plurality of the left sensor signals;
    a left minimum signal measuring unit which determines a left minimum magnitude of the left sensor signals stored in the left memory;
    a left error unit which generates a left row error signal as a function of the left sensor signal;
    a left comparison unit which compares the left minimum magnitude to a threshold, the left comparison unit generating a left gap signal representing an absence of plants in the left crop row if the left minimum signal is less than the threshold;
    a right memory which stores a plurality of right sensor signals;
    a right minimum signal measuring unit which determines a right minimum magnitude of the right sensor signals stored in the right memory;
    a right error unit which generates a right row error signal as a function of the right sensor signal;
    a right comparison unit which compares the right minimum magnitude to the threshold, the right comparison unit generating a right gap signal representing an absence of plants in the right crop row if the right minimum signal is less than the threshold; and
    a fusion/arbitration unit which generates a selected steering error signal as a function of the left and right row error signals and the left gap signal and the right gap signal.

8. The signal processing system of claim 7, further comprising:
    a left drop rate unit which generates a left drop rate signal representing a change in the left sensor signal per unit of time;
    a left gap detection unit, for detection of a gap in the crop row, which generates the left gap signal as a function of a left minimum magnitude and the left drop rate signal;
    a right drop rate unit which generates a right drop rate signal representing a change in the right sensor signal per unit of time; and
    a right gap detection unit, for detection of a gap in the crop row, which generates the right gap signal as a function of the right minimum magnitude and the right drop rate signal.

9. The signal processing system of claim 7, wherein: the fusion/arbitration unit sets the steering error signal equal to a difference between the right and left row error signals if no gap signals are being generated.

10. The signal processing system of claim 7, wherein: the left and right memories are ring buffers.

11. In an agricultural machine having a crop row sensor, the crop row sensor having a movable paddle which interacts with plants in the crop row, the sensor periodically generating a sensor signal with a parameter representing a position of the paddle, a signal processing method comprising:
    storing a plurality of sensor signals in a memory;
    determining a minimum magnitude of the sensor signals stored in the memory; and
    comparing the minimum magnitude to a threshold, and generating a gap signal representing an absence of plants in the crop row if the minimum signal is less than the threshold.

12. The signal processing method of claim 11, wherein:
the memory comprises a ring buffer.

13. The signal processing method of claim 12, wherein:
a capacity of the ring buffer is related to a time required for motion of the paddle to cease when a gap in the crop row is encountered.

14. The signal processing method of claim 11, further comprising:
generating a drop rate signal representing a change in the sensor signal in a period of time; and
generating the gap signal as a function of the minimum magnitude and the drop rate signal.

15. The signal processing method of claim 14, wherein:
comparing the minimum magnitude to a first threshold and generating a no gap flag if the minimum magnitude is not below the first threshold; and
if the minimum magnitude is below the first threshold, comparing the drop rate to a second threshold, and generating the no gap flag if the drop rate is not greater than the second threshold, and generates a gap detected flag if the drop rate is greater than the second threshold.

16. The signal processing method of claim 11, wherein:
a capacity of the memory is related to a time required for motion of the paddle to cease when a gap in the crop row is encountered.

* * * * *